United States Patent [19]

Zander

[11] Patent Number: 4,468,618

[45] Date of Patent: Aug. 28, 1984

[54] SYSTEM FOR GENERATING A SPEED-PROPORTIONAL VOLTAGE

[75] Inventor: Hans-Hermann Zander, Erlangen, Fed. Rep. of Germany

[73] Assignee: Siemens Aktiengesellschaft, Berlin and Munich, Fed. Rep. of Germany

[21] Appl. No.: 437,489

[22] Filed: Oct. 28, 1982

[51] Int. Cl.³ ............................................. G01P 13/00
[52] U.S. Cl. ................................................... 324/165
[58] Field of Search .......................... 318/321; 322/31; 324/163, 165

[56] References Cited

U.S. PATENT DOCUMENTS 3,882,402 5/1975 Jensen .............................. 324/165 X
4,228,396 10/1980 Palombo .............................. 324/163

Primary Examiner—Stanley T. Krawczewicz
Assistant Examiner—Jose M. Solis
Attorney, Agent, or Firm—Kenyon & Kenyon

[57] ABSTRACT

Method and apparatus for producing a speed-proportional signal from first and second transmitter voltages which are produced by an incremental position generator and shifted 90° with respect to each other in directions which correspond to the direction of rotation of the incremental position generator. An adder and a subtractor are provided for respectively producing a sum signal corresponding to an addition of the transmitter voltages, and a difference signal corresponding to the difference between the transmitter voltages. The sum and difference signals are each differentiated over ranges which correspond to ±45° about their respective zero crossing. The differentiated signals are rectified in a controlled manner responsive to the phase of the first and second transmitter voltages. In this manner, a speed-proportional voltage is produced having a polarity which corresponds to the direction of rotation of the position transmitter.

4 Claims, 5 Drawing Figures

SYSTEM FOR GENERATING A SPEED-PROPORTIONAL VOLTAGE

BACKGROUND OF THE INVENTION

This invention relates generally to systems for generating speed-proportional signals, and more particularly, to a system for generating a speed-proportional voltage having an incremental position transmitter which provides two transmitter voltages which are shifted in the positive or negative direction with respect to one another by 90°, depending upon the direction of rotation, the voltage having a speed-independent amplitude.

Incremental position transmitters of the type which provide two transmitter voltages shifted by 90° in the positive or negative direction, depending upon the direction of rotation, are commercially available. Such position transmitters contain a disc which is connected to a rotating part, the disc having markings distributed along its circumference. The disc is scanned optically, or inductively, so that a pulse sequence is formed having a frequency which is proportional to the speed of the rotating part. However, the amplitude of the pulses is independent of the speed. Information pertaining to the position of the rotating part is obtained by counting the pulses. If the pulse sequence is coupled to a frequency-voltage converter, a signal at the output of the converter is obtained which corresponds to the speed of the rotating part. In the known systems, a relatively large number of pulses must be evaluated in order to determine the speed, and therefore the speed signal reacts with considerable delay to variations in the actual speed of the rotating part. This delay produces a disturbing effect in the operation of speed control circuits.

Three-phase tachometer generators are frequently used for measuring speed. The tachometer generators produce a voltage having an amplitude which is proportional to the speed of the tachometer generator. Diodes having predetermined threshold voltages are generally required for rectifying the three-phase current; the threshold voltage producing a disturbing effect especially at low speeds. Since the rectified signal of the three-phase tachometer generator does not produce a signal polarity which is responsive to the direction of rotation, complicated additional measures for determining the direction of rotation from the phase sequence of the three-phase current are necessary. The foregoing disadvantges are avoided, however, by utilizing a DC tachometer generator which supplies a DC voltage having an amplitude which is proportional to the speed, the DC voltage having a polarity which is independent of the direction of rotation. It is a problem with such DC tachometer generators, however, that the electromechanical commutator which is required exhibits relatively rapid wear. Both kinds of tachometer generators have the further disadvantage that no position information can be derived from their output signals. A position generator is therefore required in addition for determining the position of the rotating part.

It is, therefore, an object of this invention to provide a method for generating a speed-proportional voltage wherein the reaction time to variations in speed is small.

It is a further object of this invention to provide an apparatus for producing a speed-proportional voltage which exhibits short reaction times to variations in the speed of the rotating part if the apparatus is used in incremental position transmitters.

SUMMARY OF THE INVENTION

The foregoing and other objects are achieved by this invention which provides a sum voltage and a difference voltage which are achieved through addition and subtraction of first and second transmitter voltages. The sum and difference voltages are differentiated respectively within a range of ±45° about the zero crossing of the respective voltage. The differentiated voltages are rectified, and controlled with respect to the phase positions of the first and second transmitter voltages so that, by means of addition, an output voltage is generated having a polarity which corresponds to the direction of rotation of a speed transmitter.

In accordance with the inventive arrangement, a speed-proportional signal is generated by differentiation of 90° blocks of the sum and difference voltages of the two transmitter voltages. Since the differentiation is performed in the region in which, for example, sinusoidal voltages are relatively linear, a voltage waveform is generated which is nearly rectangular. Since the amplitude deviations of the two AC voltages are equalized by addition and subtraction of the two transmitter voltages, all rectangular blocks have the same height. After the rectangular blocks are combined by controlled rectification, a speed-proportional output voltage is produced which has a small amount of ripple. Thus, additional smoothing for the output voltage, which would produce a disturbing time constant, is not necessary for most applications. Since, in accordance with the present inventive method, the speed is not determined, as in the prior art, by counting pulses, but by determining the rate of rise of each individual pulse, the reaction time to speed changes is very short. The position transmitter can be employed simultaneously for measuring the position and the speed.

In one advantageous embodiment, the sum voltages are conducted to a differentiator if the first transmitter voltage is positive and the second transmitter voltage is negative. The difference voltage is conducted to the differentiator if the first and second transmitter voltages are positive. The inverted sum voltage is conducted to the differentiator if the first transmitter voltage is negative and the second transmitter voltage is positive. Finally, the inverted difference voltage is connected to the differentiator if the first and second transmitter voltages are negative. In this manner, a logical linkage of the polarities of the transmitter voltages is utilized for forming the 90° blocks from the sum and difference voltages, respectively. Through selection of the inverted or noninverted sum and difference voltage, an AC waveform is produced when the individual blocks are added together. It is important in this connection that this AC voltage waveform have no discontinuities since such discontinuites would lead to voltage peaks in the differentiated voltage. During the controlled rectification, the differentiated voltage is advantageously inverted if the instantaneous values of the two transmitter voltages have the same polarity, and the differentiated voltage remains unchanged if the instantaneous transmitter voltages have opposite polarity. In this manner, a logical connection of the polarities of the two transmitter voltages is also utilized for controlling the rectification in order to obtain an output signal having polarities which correspond to the direction of rotation of the speed transmitter.

In a circuit arrangement constructed in accordance with the principles of the invention, the two transmitter voltages of the position transmitter are fed to respective inputs of an adder and a subtractor. The outputs of the adder and the subtractor are directly connected to one another, and each via an inverter to the inputs of a selection circuit. The selection circuit is controlled by two zero comparators, at the inputs of which are provided one of the two transmitter voltages of the position transmitter. The selection circuit connects one of its inputs to its output depending upon the output signals of the two zero comparators. The selection circuit is followed by a differentiation stage having an output which is connected to a rectifier controlled in response to the two zero comparator. The rectifier produces at its output the desired speed-proportional output signal. This circuit arrangement permits implementation of the method described hereinabove using only a few commercially available components.

BRIEF DESCRIPTION OF THE DRAWINGS

Comprehension of the invention is facilitated by reading the following detailed description in conjunction with the annexed drawings, in which.

DETAILED DESCRIPTION

Figure 1:
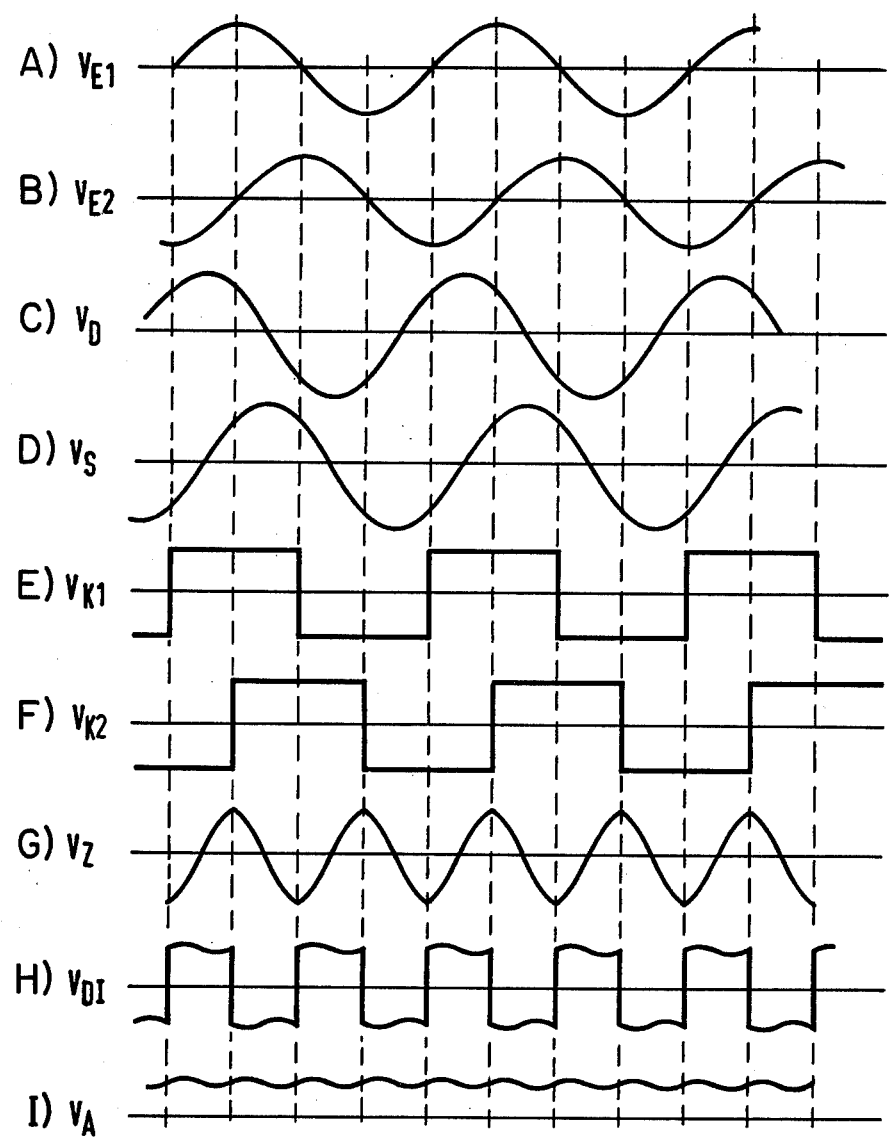
FIGS. 1 and 2 are voltage waveform diagrams arranged on common time scales, and which are useful in explaining the present invention.

FIG. 1 shows a voltage waveform diagram having a plurality of voltage waveforms A–I arranged on a common time scale, the diagram being useful for explaining the method aspect of the invention. In the practice of the method, a position transmitter supplies two AC voltages $V_{E1}$ and $V_{E2}$, FIG. 1A and FIG. 1B, respectively, which are approximately sinusoidal in this embodiment, as is the case with many known position transmitters. Except for pure square-wave voltages, which do not occur in practice, any other waveform would be suitable for the method herein. The frequency of transmitter voltages $V_{E1}$ and $V_{E2}$ is proportional to the speed of rotation, but the amplitude is independent of the speed of rotation. Transmitter voltage $V_{E2}$ is shifted in phase by $+90°$ with respect to transmitter voltage $V_{E1}$, in this embodiment. For negative direction of rotation, the phase shift is $-90°$. Transmitter voltages $V_{E1}$ and $V_{E2}$ are combined to form a sum voltage $V_S$ and a difference voltage $V_D$. Such addition and subtraction produces, therefore, two AC voltages which are shifted in phase with respect to one another by $\pm 90°$, and which have a frequency which agrees with the frequency of transmitter voltages $V_{E1}$ and $V_{E2}$. The amplitudes of the sum voltage $V_S$ and the difference voltage $V_D$ are equal to the sum of the amplitudes of the transmitter voltages $V_{E1}$ and $V_{E2}$. Even if transmitter voltages $V_{E1}$ and $V_{E2}$ have different amplitudes, sum and difference voltages $V_S$ and $V_D$ always have the same amplitude. The voltages $V_S$ and $V_D$ are shifted in phase by $\pm 45°$ with respect to transmitter voltages $V_{E1}$ and $V_{E2}$.

In the present invention, the fact that sum and difference voltages $V_S$ and $V_D$ are shifted $\pm 45°$ with respect to transmitter voltages $V_{E1}$ and $V_{E2}$ is utilized to produce a plurality of voltage waveform blocks which are arranged in a range between $\pm 45°$ about the zero crossing of the sum and difference voltages. The voltage waveform blocks are combined with one another, if necessary after inversion, so as to produce an auxiliary voltage $V_Z$ (FIG. 1G) which is free of discontinuities. In the figure, the polarities of transmitter voltages $V_{E1}$ and $V_{E2}$ are shown as waveforms designated $V_{K1}$ and $V_{K2}$ (FIGS. 1E and 1F). Polarity signals $V_{K1}$ and $V_{K2}$ are compared against one another. While $V_{K1}$ is positive and $V_{K2}$ is negative, a sum voltage $V_S$ (FIG. 1D) is used for determining auxiliary voltage $V_Z$. While both polarity signals $V_{K1}$ and $V_{K2}$ are positive, a difference voltage $V_D$ (FIG. 1C) is used to form auxiliary voltage $V_Z$. If $V_{K1}$ is negative and $V_{K2}$ is positive, then $V_S$ is inverted and used for forming auxiliary voltage $V_Z$, and if $V_{K1}$ and $V_{K2}$ are negative, then $V_D$ is inverted and used for forming auxiliary voltage $V_Z$. Accordingly, the following logic scheme is achieved:

($V_{K1}$ positive) $\wedge$ ($V_{K2}$ negative) $\rightarrow V_Z = V_S$
($V_{K1}$ positive) $\wedge$ ($V_{K2}$ positive) $\rightarrow V_Z = V_D$
($V_{K1}$ negative) $\wedge$ ($V_{K2}$ positive) $\rightarrow V_Z = \overline{V_S}$
($V_{K1}$ negative) $\wedge$ ($V_{K2}$ negative) $\rightarrow V_Z = \overline{V_D}$ In accordance with the foregoing, a suitable combination of 90° voltage waveform blocks of sum voltage $V_S$ and difference voltage $V_D$ produces auxiliary AC voltage $V_Z$ having a frequency which is twice that of transmitter voltages $V_{E1}$ and $V_{E2}$. Auxiliary voltage $V_Z$ has no discontinuities because, as noted hereinabove, voltage $V_S$ and $V_D$ have equal amplitudes, and these voltages have equal instantaneous values 45° before and after the zero crossings, respectively.

Auxiliary voltage $V_Z$ is then differentiated to produce a voltage $V_{DI}$ (FIG. 1H). The amplitude of voltage $V_{DI}$, as a result of a well known mathematical relationship, is independent of the predetermined voltage wave shape, proportional to the frequency of auxiliary voltage $V_Z$, and therefore, also proportional to the speed of rotation of the position transmitter. The method described herein has the advantage that auxiliary voltage $V_Z$ is composed of voltage waveform blocks of sum voltage $V_S$ and difference voltage $V_D$ which are in the relatively linear portion of an approximately sinusoidal waveform curve. Differentiated voltage $V_{DI}$ is therefore composed of approximate square-wave pulses, each such square-wave pulse having relatively little ripple. If differentiated voltage $V_{DI}$ is rectified, a DC voltage having a relatively small ripple is obtained as an output voltage $V_A$, which is proportional to the speed of rotation of the speed transmitter. In order that the polarity of output signal $V_A$ correspond to the direction of rotation of the position transmitter, controlled rectification is required so as to produce a controlled combination of the positive and negative pulses of differentiator voltage $V_{DI}$. This is achieved by using the inverted differentiated voltage $V_{DI}$ for forming output voltage $V_A$, as long as the polarities of transmitter voltages $V_{E1}$ and $V_{E2}$ are equal, and the noninverted differentiated voltage $V_{DI}$ is used as long as the polarities of the two transmitter voltages are different from each other. In the illustrative example of FIG. 1 which describes a positive direction of rotation, output signal $V_A$ is also positive.

Figure 2:
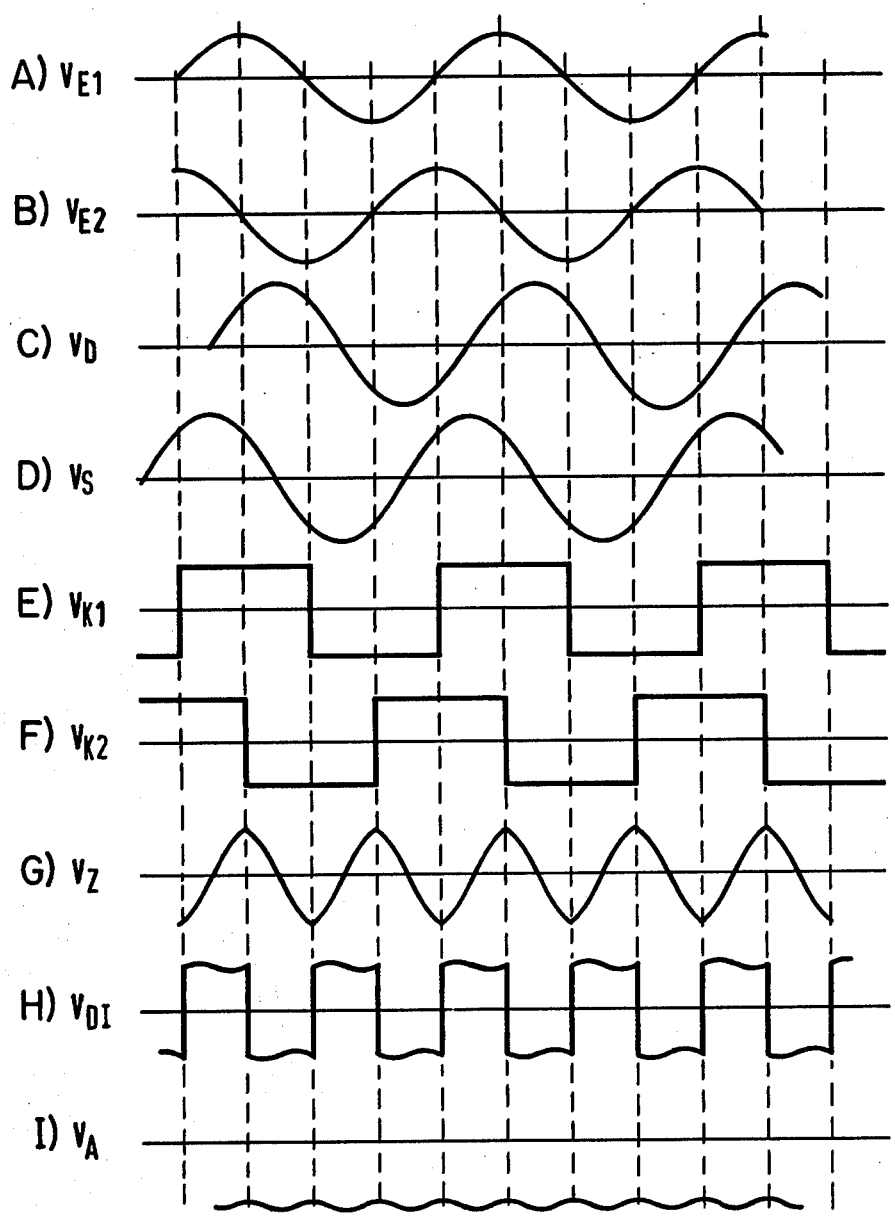

FIG. 2 shows a plurality of waveforms arranged on a common time scale, the waveforms being similar to those described hereinabove with respect to FIG. 1, except that the direction of rotation of the speed transmitter is negative. In FIG. 2, therefore, transmitter voltage $V_{E2}$ (FIG. 2B) does not lag transmitter voltage $V_{E1}$ (FIG. 2A) by 90°, but rather leads it by 90°. Correspondingly, sum voltage $V_S$ (FIG. 2D) has a phase shift of $-90°$ with respect to difference voltage $V_D$ (FIG. 2C). As shown in FIG. 2, auxiliary voltage $V_Z$ (FIG. 2G) and therefore also the differentiated voltage $V_{DI}$ (FIG. 2H), remain unchanged for the negative direction of rotation. As a result of the logical interconnections which are provided for the controlled rectification of the differentiator voltage (i.e., inversion of the differentiator voltage $V_{DI}$ if the polarity of $V_{E1}$ and $V_{E2}$ agree, and no inversion if $V_{E1}$ and $V_{E2}$ have different polarities) a negative output voltage $V_A$ is obtained.

In accordance with the described method, a speed-proportional output voltage $V_A$ (FIG. 2I) is obtained having a polarity which corresponds to the direction of rotation of the position transmitter. Since each individual pulse is evaluated for the measurement of the speed of rotation and no smoothing is required, output voltage $V_A$ reacts to speed changes very quickly.

Figure 3:
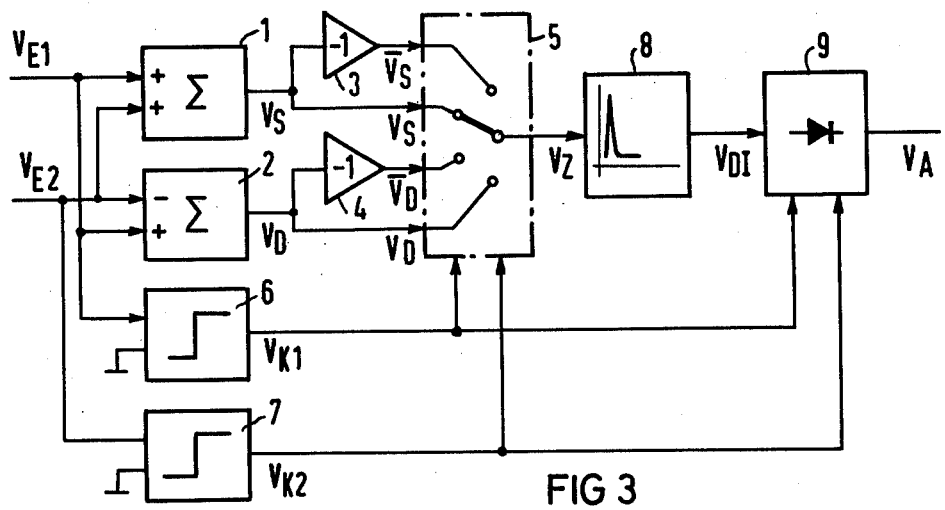
FIG. 3 is a block and schematic representation of a circuit arrangement constructed in accordance with the principles of the invention.

FIG. 3 shows a block and line representation of a circuit embodiment which implements the foregoing method. Transmitter voltages $V_{E1}$ and $V_{E2}$ are supplied from a position transmitter (not shown) to the inputs of an adder 1. Moreover, transmitter voltages $V_{E1}$ and $V_{E2}$ are conducted to additive and subtractive inputs, respectively, of a subtraction stage 2. Adder 1 and subtraction stage 2 provide at respective outputs sum voltage $V_S$ and difference voltage $V_D$. The outputs are connected via respective inverters 3 and 4 to the inputs of a selection circuit 5.

Transmitter voltage $V_{E1}$ is coupled to an input of a comparator 6 and transmitter voltage $V_{E2}$ is coupled to an input of a comparator 7. Comparators 6 and 7 are each provided with second inputs which are connected to a reference potential, illustratively ground. In this manner, comparators 6 and 7 produce at their respective outputs the polarity signals $V_{K1}$ and $V_{K2}$; the polarity signals corresponding to the polarity of respective transmitter signals $V_{E1}$ and $V_{E2}$. Selection circuit 5 is controlled in response to the polarity signals so that the output of selection circuit 5 always bears a selectable one of sum and difference voltages $V_S$ and $V_D$, or their inversions. The output of selection circuit 5 therefore bears auxiliary voltage $V_Z$, which is conducted to an input of a differentiator 8. Differentiator 8 produces at its output differentiated voltage $V_{DI}$. The differentiator voltage $V_{DI}$ is provided at an input of a controlled rectifier 9 which is controlled in response to polarity signal $V_{K1}$ and $V_{K2}$ in accordance with the method described hereinabove. Desired output voltage $V_A$ is available at the output of controlled rectifier 9.

Figure 4:
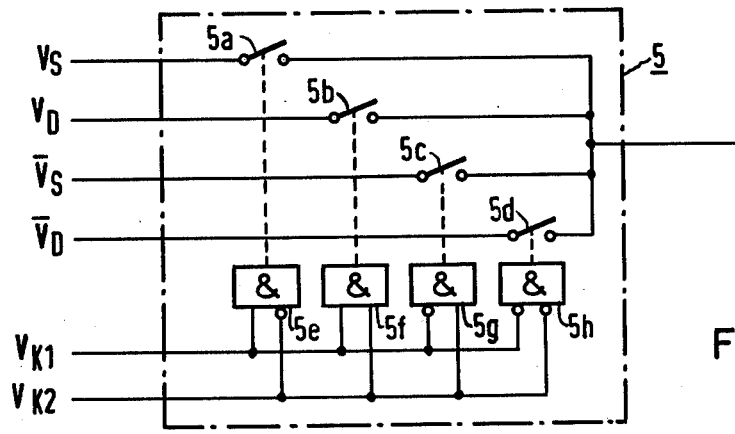
FIG. 4 is a block and schematic representation of an illustrative embodiment of a selection circuit 5 shown in FIG. 3.

FIG. 4 is a block and schematic representation of a specific illustrative example of selection circuit 5. In this embodiment, the inputs of the selection circuit are connected via switches 5a, 5b, 5c, and 5d, which may be semiconductor switches, to the output of selection circuit 5. Switches 5a–5d are addressed by AND gates 5e, 5f, 5g, and 5h, respectively. In this embodiment, logical interconnections are achieved for controlling switches 5a–5d in accordance with the foregoing method, and in response to polarity signals $V_{K1}$ and $V_{K2}$, in accordance with the following table:

$V_{K1} \wedge V_{K2} \rightarrow 5a$
$V_{K1} \wedge V_{K2} \rightarrow 5b$
$V_{K1} \wedge V_{K2} \rightarrow 5c$
$V_{K1} \wedge V_{K2} \rightarrow 5d$ As shown in FIG. 4, polarity signal $V_{K1}$ is connected to a noninverting input of AND gate 5e, while polarity signal $V_{K2}$ is connected to an inverting input thereof. The polarity signals are further connected to noninverting inputs of AND gate 5f which controls semiconductor switch 5d. Polarity signals $V_{K1}$ and $V_{K2}$ are further connected to respective inverting and noninverting inputs of AND gate 5g which controls switch 5c. Finally, polarity signals $V_{K1}$ and $V_{K2}$ are connected to inverting inputs of AND gate 5h which controls switch 5d.

Figure 5:
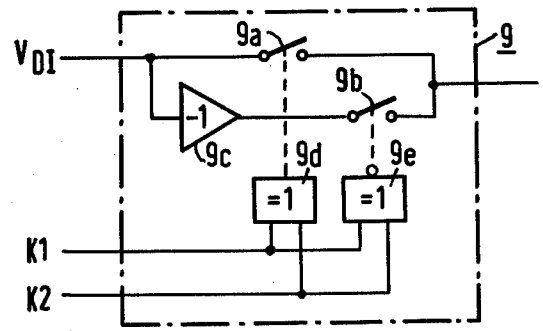
FIG. 5 is a block and schematic representation of a controlled rectifier which is suitable for use in the embodiment of FIG. 3.

FIG. 5 is a block and line representation of a specific illustrative embodiment of a controlled rectifier 9. Differentiator voltage $V_{DI}$ is provided at an input of controlled rectifier 9 and is conducted to a semiconductor switch 9a which couples differentiator voltage $V_{DI}$ to the output of the controlled rectifier. In addition, $V_{DI}$ is connected to an inverter 9c which is connected at its output to a switch 9b. By this circuitry, inverter voltage $V_{DI}$ is coupled to the output of controlled rectifier 9. In this manner, the logical connections for controlling controlled rectifier 9, specifically that inversion is achieved if polarity signals $V_{K1}$ and $V_{K2}$ are equal, and no inversion is achieved if the polarities of the polarity signals are different, are achieved using exclusive-OR gate 9d and 9e, which receive at their inputs the polarity signals. Exclusive-OR gate 9d is connected to control switch 9a, and exclusive-OR gate 9e, which has an inverting output, is connected to control switch 9b. Thus, polarity signals $V_{K1}$ and $V_{K2}$ control controlled rectifier 9.

Although the invention has been described in terms of specific embodiments and applications, persons skilled in the art, in light of this teaching, can generate additional embodiments without departing from the spirit or exceeding the scope of the claimed invention. Accordingly, it is to be understood that the drawings and descriptions in this disclosure are proffered to facilitate comprehension of the invention and should not be construed to limit the scope thereof.

What is claimed is:

1. A method for generating a speed-proportional signal from first and second sinusoidal transmitter voltages which are produced by an incremental position generator and shifted 90° with respect to each other in directions which correspond to the direction of rotation of the incremental position generator, the first and second sinusoidal transmitter voltages having respective amplitudes which are independent of the speed of rotation, from which is produced a sum signal responsive to the sum of the first and second sinusoidal transmitter voltages, the sum signal having a plurality of sequential zero crossings
and a difference signal responsive to the difference between the first and second sinusoidal transmitter voltages, the difference signal having a plurality of sequential zero crossing the method comprising the steps of:
differentiating the sum and difference signals within ±45° of their respective zero crossings to produce respective differentiated signals; and
rectifying said differentiated signals in a controlled rectifier which is responsive to the first and second sinusoidal transmitter voltages, to produce the speed-proportional signal having a polarity which corresponds to the direction of rotation of the incremental position generator.

2. The method of claim 1 wherein there are further provided the steps of:
coupling the sum signal to a differentiator when the first sinusoidal transmitter voltage has a positive polarity and the second transmitter voltage has a negative polarity;
coupling the difference signal to said differentiator when the first and second transmitter voltages have positive polarities;
inverting the sum signal and coupling said inverted sum signal to said differentiator when the first sinusoidal transmitter voltage has a negative polarity and the second sinusoidal transmitter voltage has a positive polarity; and
inverting the difference signal and coupling said inverted difference signal to said differentiator when the first and second sinusoidal transmitter voltages have negative polarities.

3. The method of claim 1 wherein said step of rectifying said differentiated signals comprises the steps of:
inverting said differentiated signals when instantaneous values of the first and second sinusoidal transmitter voltages have the same polarity; and
conducting said differentiated signals in a noninverted form when instantaneous values of the first and second sinusoidal transmitter voltages have opposite polarities.

4. A circuit arrangement for generating a speed-proportional signal from first and second sinusoidal transmitter voltages which are produced by an incremental position generator and shifted in phase 90° with respect to each other in directions which correspond to the direction of rotation of the incremental position generator, the circuit arrangement being further provided with adder means having first and second inputs for receiving the first and second sinusoidal transmitter voltages, respectively, and an output for producing a sum signal, and a subtraction means having noninverting and inverting inputs for receiving the first and second sinusoidal transmitter voltages, respectively, and an output for producing a difference signal, the circuit arrangement further comprising:
inverter means coupled to the outputs of the adder means and the subtraction means for producing an inverted sum signal and an inverted difference signal;
first and second comparator means each having a first input for receiving a selected one of the first and second sinusoidal transmitter voltages, a second input for receiving a zero reference signal, and an output for producing a respective one of first and second polarity signals responsive to said selected one of the first and second sinusoidal transmitter voltages;
selection means having a plurality of signal inputs for receiving the sum signal, the difference signal, said inverted sum signal, and said inverted difference signal, respectively, said selection means further having first and second control inputs for receiving said first and second polarity signals, and an output for producing a selector output signal corresponding to selected ones of said signals at said signal inputs selected in response to said first and second polarity signals at said first and second control inputs;
differentiation means connected at an input thereof to said output of said selection means for receiving said selector output signal and producing at an output thereof a differentiated signal; and
rectifier means connected at an input thereof to said input of said differentiation means for receiving said differentiated signal, said rectifier means further having control inputs for receiving said first and second polarity signals from said first and second zero comparator means, and an output for producing the speed-proportional signal, the speed-proportional signal corresponding to said differentiated signal which has been rectified in response to said first and second polarity signals.

* * * * *